United States Patent
Schediwy et al.

(10) Patent No.: US 8,089,470 B1
(45) Date of Patent: Jan. 3, 2012

(54) FINGER/STYLUS TOUCH PAD

(75) Inventors: Richard Robert Schediwy, Union City, CA (US); Federico Faggin, Los Altos Hills, CA (US)

(73) Assignee: Synaptics Incorporated, Santa Clara, CA (US)

( * ) Notice: Subject to any disclaimer, the term of this patent is extended or adjusted under 35 U.S.C. 154(b) by 541 days.

(21) Appl. No.: 09/176,639

(22) Filed: Oct. 20, 1998

(51) Int. Cl.
G06F 3/041 (2006.01)
G06F 3/044 (2006.01)
G08C 21/00 (2006.01)

(52) U.S. Cl. .......... 345/173; 178/18.06; 178/18.01; 345/156

(58) Field of Classification Search .......... 395/149, 395/326, 800; 345/156–176; 361/280; 382/13; 178/18, 18.01–19.02; 455/11.1; 430/496
See application file for complete search history.

(56) References Cited

U.S. PATENT DOCUMENTS

| | | | |
|---|---|---|---|
| 4,124,747 A | 11/1978 | Murer et al. | |
| 4,436,648 A | 3/1984 | Khanna et al. | |
| 4,641,354 A * | 2/1987 | Fukunaga et al. | 382/13 |
| 4,731,694 A * | 3/1988 | Grabner et al. | 361/280 |
| 4,772,422 A | 9/1988 | Hijikata et al. | |
| 5,133,076 A * | 7/1992 | Hawkins et al. | 395/800 |
| 5,207,949 A | 5/1993 | Niino et al. | |
| 5,374,787 A | 12/1994 | Miller et al. | |
| 5,386,219 A * | 1/1995 | Greanias et al. | 345/174 |
| 5,455,901 A * | 10/1995 | Friend et al. | 395/149 |
| 5,502,461 A * | 3/1996 | Okamoto et al. | 345/173 |
| 5,558,977 A * | 9/1996 | DePalma et al. | 430/496 |
| 5,587,560 A * | 12/1996 | Crooks et al. | 178/18 |
| 5,600,781 A * | 2/1997 | Root et al. | 395/326 |
| 5,983,073 A * | 11/1999 | Ditzik | 455/11.1 |

* cited by examiner

*Primary Examiner* — Srilakshmi K Kumar
(74) *Attorney, Agent, or Firm* — Ingrassia Fisher & Lorenz, P.C.

(57) ABSTRACT

A touch pad module to implement user input functions to an electronic device. The touch pad module includes a sensor layer which, when used in conjunction with an insulative layer and contiguous conductive layer enable the touch pad module to sense both finger and stylus input data to the electronic device.

46 Claims, 13 Drawing Sheets

Capacitive touch pad with additional conductive layer providing sufficient signal with stylus Detecting a finger on an insulating layer over the electrodes
(PRIOR ART)

Measurement of finger capacitance in one dimension
(PRIOR ART)

Stylus with small tip provides insufficient signal (PRIOR ART)

Stylus with enlarged tip to provide sufficient signal (PRIOR ART)

Capacitive touch pad with additional conductive layer providing sufficient signal with stylus Additional conductive layer with conductance too high Additional conductive layer with conductance too low Capacitive touch pad with additional conductive layer providing sufficient signal with finger Distortion in position measurement near edge of sensor Providing visual feedback

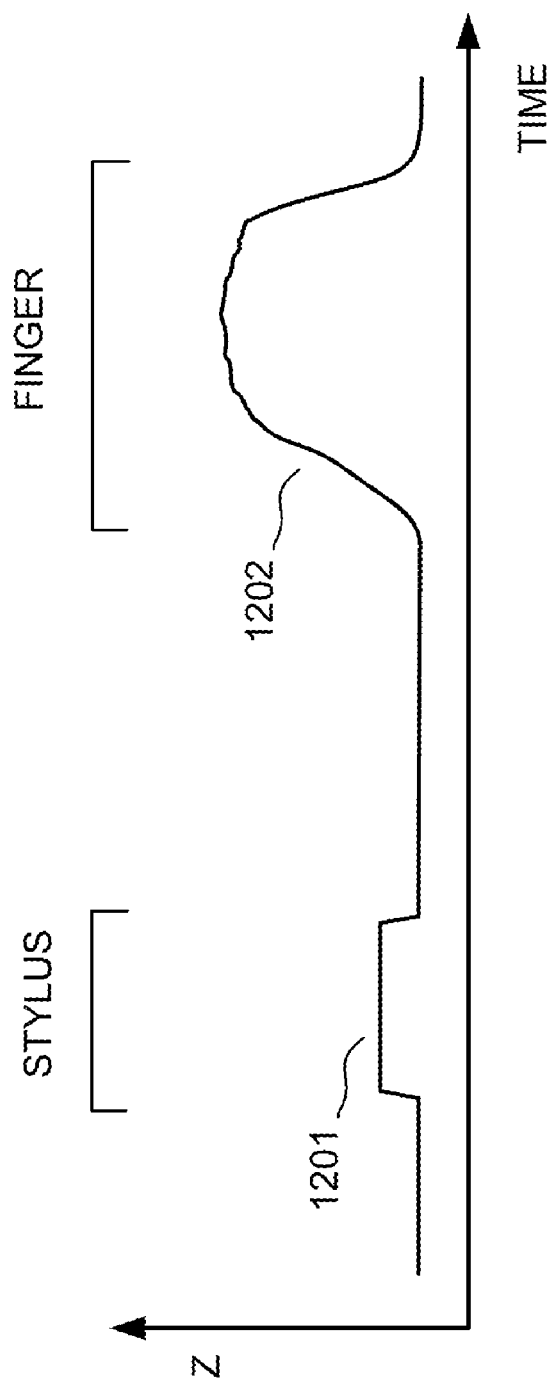

FINGER/STYLUS TOUCH PAD

TECHNICAL FIELD OF THE INVENTION

The present invention involves a touch pad module for use with an electronic device, such as a notebook computer, which makes use of such modules to implement user input functions. The touch pad module is configured of certain insulative and conductive layers as to enable the electronic device to sense input data from both finger and stylus.

BACKGROUND OF THE INVENTION

Over the last several years, capacitive touch pad pointing devices have entered widespread use in personal computers. There are at least three distinct capacitive sensing technologies used in touch pad devices today:

1. The "Field Distortion" approach, used by Cirque and Alps as described in PCT Application No. US90/04584, Publication No. WO91/03039 to Gerpheide. Specifically, Gerpheide teaches the application of an oscillating potential of a given frequency and phase to all electrodes on one side of a virtual dipole, and an oscillating potential of the same frequency and opposite phase to those on the other side. Electronic circuits develop a "balanced signal" which is zero when no finger is present, and which has the polarity of a finger on one side of the center of the virtual dipole, and the opposite polarity of the finger on the opposite side. To characterize the position of the finger initially, the virtual dipole is scanned sequentially across the tablet. Once the finger is located, it is "tracked" by moving the virtual dipole toward the finger once the finger has moved more than a row or column of the matrix constituting the capacitive sensor touch pad. Because the virtual dipole method operates by generating a balance signal that is zero when the capacitance does not vary with distance, it only senses the perimeter of the finger contact area, rather than the entire contact area.
2. The charge-detection approach used by the present assignee described in its U.S. Pat. No. 5,374,787 to Miller et al. Specifically, the present assignee employs what is called a "finger pointer" technique. This approach is to provide a position sensing system including a position sensing transducer comprising a touch-sensitive surface disposed on a substrate, such as a printed circuit board, including a matrix of conductive lines. A first set of conductive lines runs in a first direction and is insulated from the a second set of conductive lines running in a second direction generally perpendicular to the first direction. An insulating layer is disposed over the first and second sets of conductive lines. The insulative layer is thin enough to promote significant capacitive coupling between a finger placed on its surface and the first and second sets of conductive lines. Sensing electrodes respond to the proximity of a finger to translate the capacitance changes of the conductors caused by the finger proximity into position and touch pressure information.
3. An unrelated approach employed currently by Logitech.

All three of these technologies share an important common feature: The finger is detected by a plurality of horizontally-aligned sensor electrodes disposed on a first layer, separated by an insulator from a plurality of vertically-aligned sensor electrodes disposed on a second layer. Such sensor electrodes are often formed as, but are not limited to, standard copper printed circuit board traces.

An example of such an electrode arrangement is shown in FIG. 1. Specifically, reference is made to FIGS. 1A through D, top, bottom, composite and cross-sectional views, respectively. Sensor array 10 is provided comprising substrate 12 including a set of first conductive traces 14 disposed on top of surface 16 thereof and run in a first direction to comprise row positions of sensor array 10. The set of second conductive traces 18 are disposed on a bottom surface 20 thereof and run in a second direction preferably orthogonal to the first direction to form the column positions of the sensor array 10. The set of first and second conductive traces 14 and 18 are alternately in contact with periodic sense pads 22 comprising enlarged areas, shown as diamonds in FIGS. 1A-1C. While sense pads 22 are shown as diamonds in FIGS. 1A-1C, any shapes such as circles, which allows close packing the sense pads 22 is equivalent for purposes of this discussion.

It is well recognized that capacitive touch pads, such as those described above, work well with fingers, but are normally unable to sense a pen or stylus. Capacitive touch pads are typically used as pointing devices. Resistive touch pads work well with pens, but require an uncomfortable amount of pressure when used with fingers. Resistive touch pads are typically used as writing or drawing input devices. To date, there has not been a practical touch pad which would work well with both fingers and pens along with a single input device to serve both functions. Such a touch pad would be especially valuable in portable applications where space is at a premium.

It is thus an object of the present invention to provide an input device in the form of a touch pad module which will accept both finger and stylus input, that is, having the desirable attributes of both a capacitive touch pad for finer input and a resistive touch pad for stylus input in the same module.

This and further objects will be more readily apparent when considering the following disclosure and appended claims.

SUMMARY OF THE INVENTION

The present invention is directed to a touch pad module to implement user input functions to an electronic device. The module comprises a sensor layer having a length and width for detecting position of a conductive object in contact with a touch pad module. An insulative layer is positioned over and contiguous with the sensor layer and a moderately conductive layer is positioned over and contiguous with the insulative layer to provide a touch pad module which can be used as both capacitive and resistive elements have been employed in the past to receive input information from both a finger conductive stylus.

BRIEF DESCRIPTION OF THE DRAWINGS

FIG. 12 is a graph of capacitance versus time showing the distinguishing characteristics between the use of stylus and finger in discriminating these two objects in providing positional input data to a suitable electronic device in using the present invention.

DETAILED DESCRIPTION OF THE INVENTION

The present invention involves a touch pad module for use with an electronic apparatus which makes use of such a module to implement all or part of its user input functions. Notebook and desktop computers as well as copiers are typical examples of such electronic apparatus having need for a touch pad device such as that disclosed herein. When used in conjunction with a computer, a touch pad allows the user to manipulate a graphics cursor on a CRT display or allows a user to manipulate a stylus thereby allowing input of written text. The touch pad comprises a sensitive planar surface and a means for detecting the position of an object, such as a finger or stylus, near or in contact with the sensitive planar surface. The touch pad continuously communicates this position information to the electronic apparatus typically at a rate of from 40 to 100 Hz.

Figure 1B:
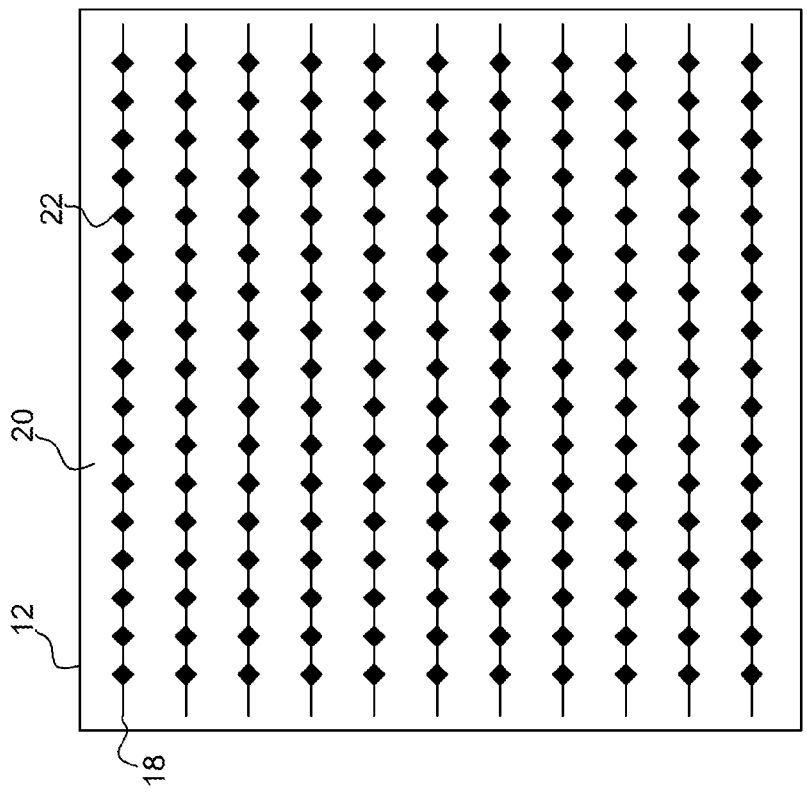
FIGS. 1A through 1D are top plan and side views of capacitive touch pads of the prior art.
Figure 1A:
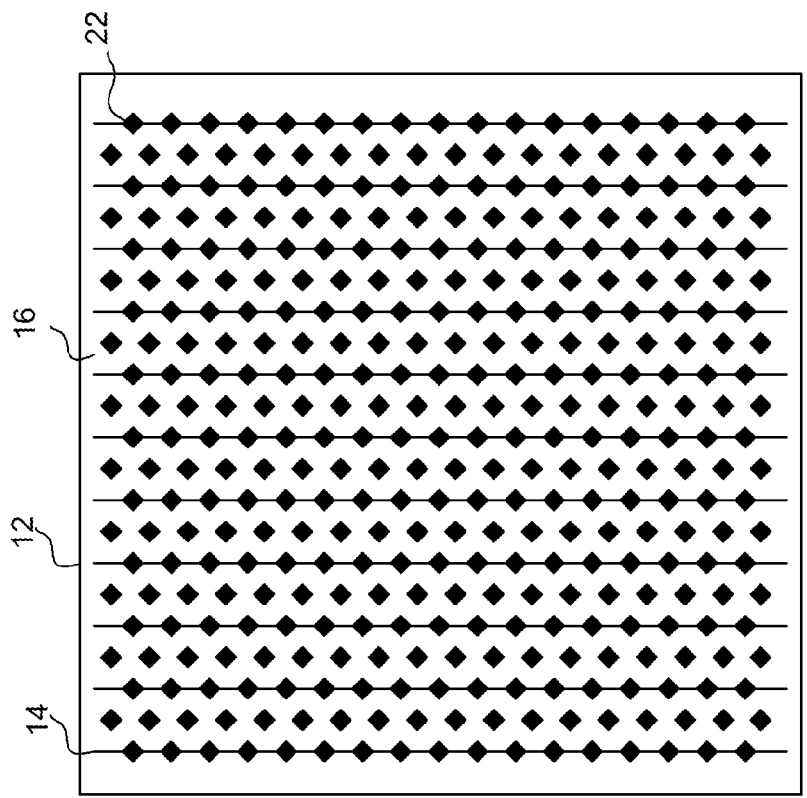
Figure 1D:
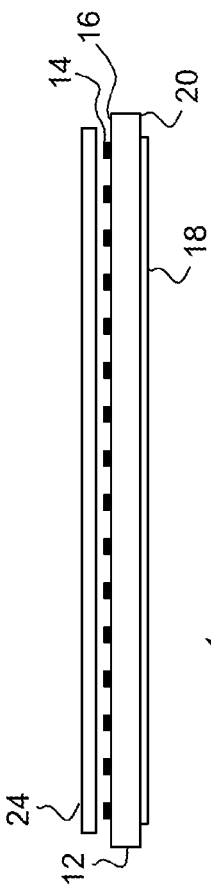
Figure 1C:
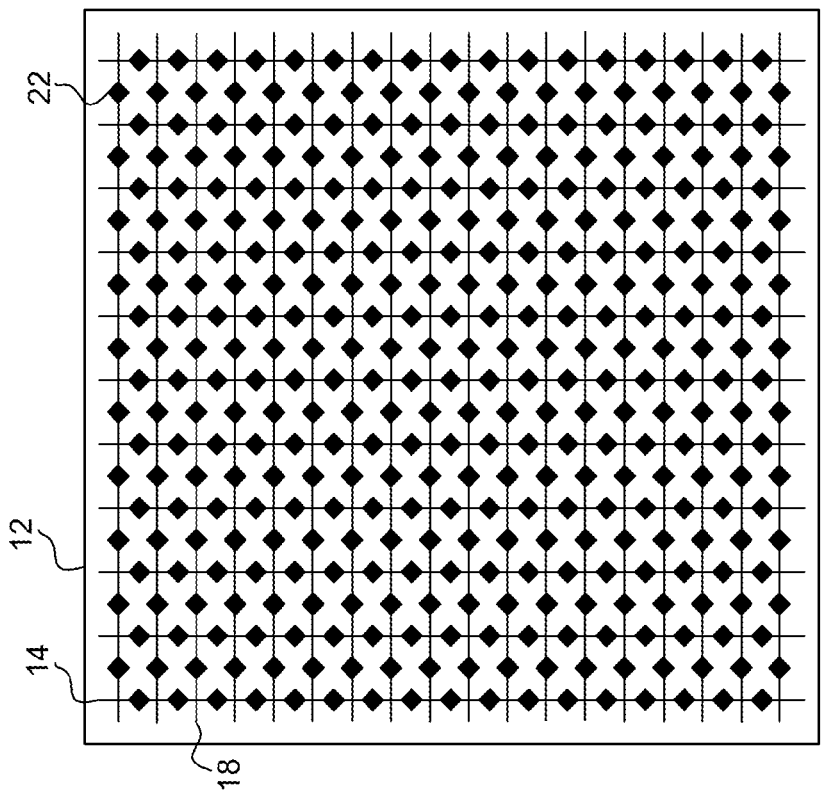
Figure 2:
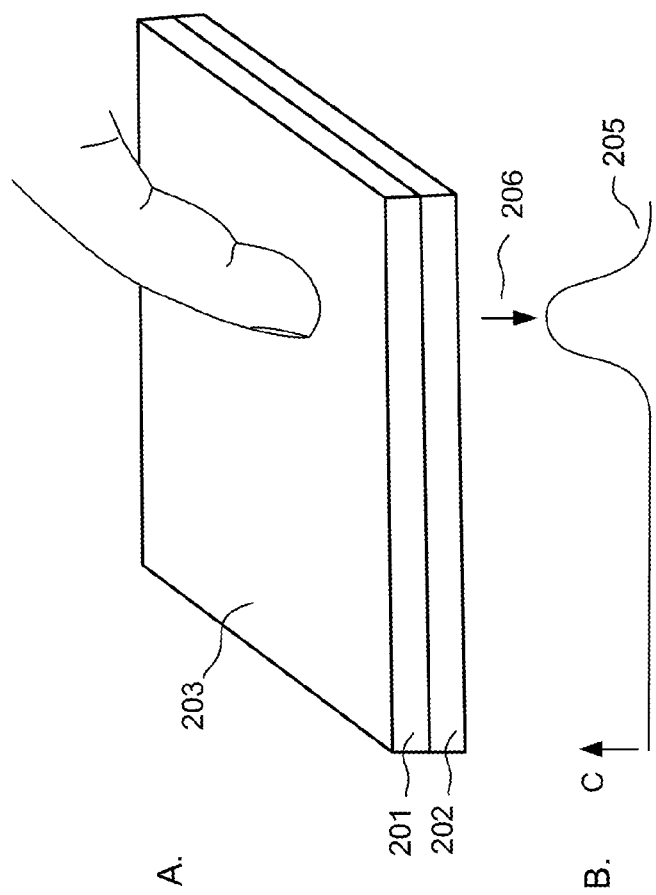
FIGS. 2A and B show, in perspective, the effect of a finger contacting a capacitive touch pad module and a graph illustrating capacitance versus horizontal position on the pad.

As noted previously, the touch pad module of the present invention can be used to implement user input functions to an electronic device through the use of both the finger of a user as well as through the use of a conductive stylus held by the user. FIG. 2 shows the effect of a finger on a sensor of the prior art, that is, capacitive sensor intended to accept positional data by the application of a fingertip to the touch pad module. Above the electrodes 202 is an insulating layer 201 which provides the surface 203 over which the finger 204 is detected (see FIG. 2A). In operation, each electrode on electrode layer 202 provides one plate of a capacitor and the finger 204, if present, provides a second plate, with the insulating layer 201 forming the dielectric between them. The conductance of the human body, combined with the human body's inherent capacitance to free space, causes the finger to appear to be electrically grounded in terms of its capacitance to the electrodes. Sensing electrodes scan the array of electrodes for increased capacitance to ground caused by the presence of a finger or other object over them. By measuring the capacitance on both the horizontal and the vertical electrodes, the location of the finger can be determined.

FIG. 2B shows a graph of capacitance versus horizontal position on the pad. The capacitance is proportional to the finger's circular area of contact. Hence, the capacitance is highest near the center of the finger and tapers off toward the edge of the region of contact. Away from the finger, the capacitance is essentially zero, i.e., unaffected by the finger. Touch pads measure the finger position by locating the peak 206 of the curve 205 in FIG. 2B.

Figure 3:
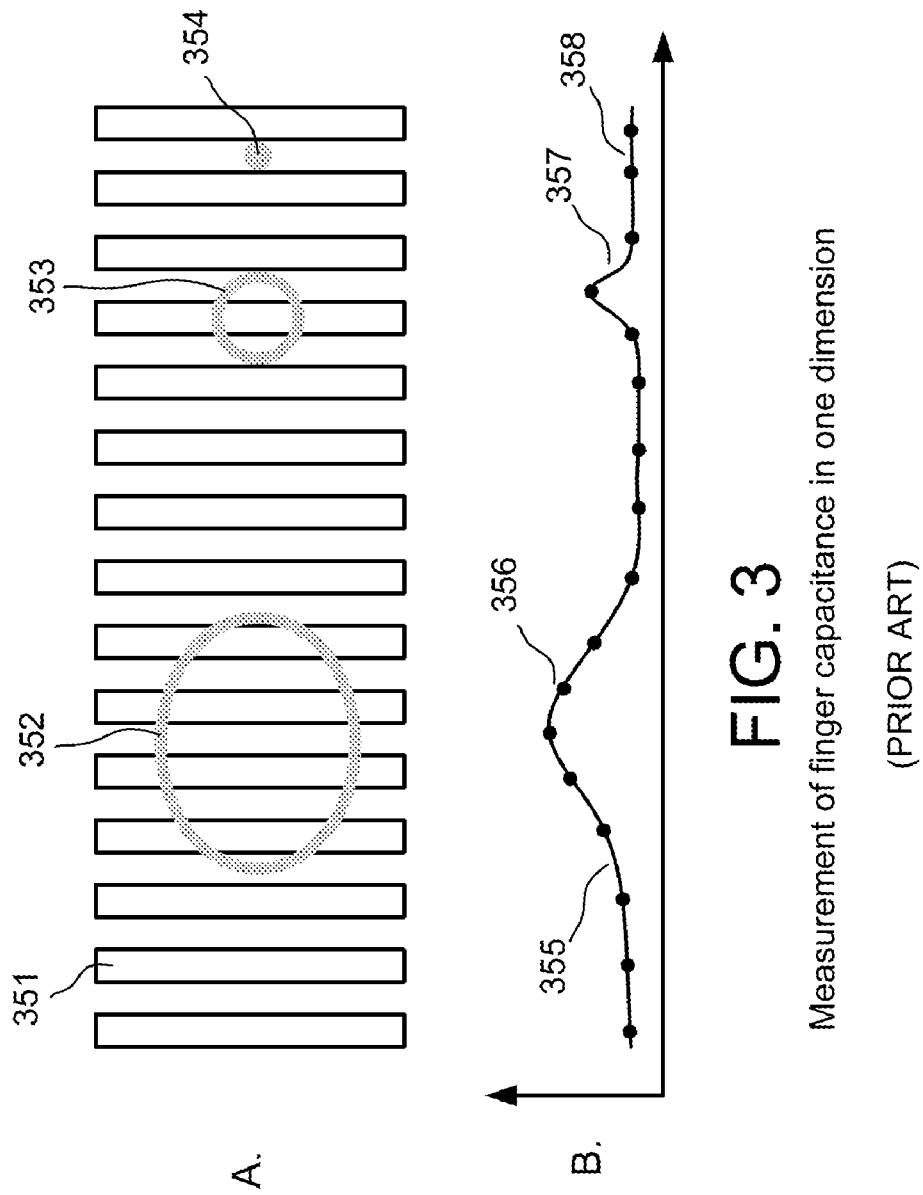
FIGS. 3A and B show a depiction, in plan view, and in graphical form, of the measurement of finger capacitance in one dimension and the capacitance of various electrodes based upon finger pressure.

The position of the finger can be determined much more accurately than the distance between the electrodes if the finger is wide enough to provide a measurable signal on more than one of the electrodes in each of the horizontal and vertical dimensions. FIG. 3 shows the effects of fingers of various sizes on the electrode matrix. For simplicity, electrode grid 351 is shown in just the horizontal dimension, and the electrodes are shown as linear wires when, in fact, a more complex pattern such as linear strings of diamond shapes may be preferred in practice. The finger (not shown) makes an approximately circular area of contact with the surface. This circular region 352 is typically large enough to cover several adjacent electrodes. The capacitance on an electrode is proportional to the area of the electrode that is covered by the finger. This area of overlap is largest near the center of the finger, and tapers off toward the edge of the finger contact region. FIG. 3B shows graph 355 of the capacitances of the various electrodes. The capacitance 356 of the electrode nearest the center of the finger is highest because that electrode has the greatest overlap with the finger. Because the finger is large compared to the electrode spacing, the adjacent electrodes sense a reduced but non-zero capacitance. The relative magnitudes of the detected capacitances on the nearby electrodes can be used to determine the position of the finger accurately with sub-electrode resolution. One popular method computes the centroid of the entire curve 355; another method finds the electrode with maximum capacitance and interpolates using a quadratic fit to the adjacent electrode readings.

If finger 353 is narrower than the distance between electrodes, then it may produce a signal on just one electrode 357 and high-resolution interpolation is impossible. If the finger 354 is extremely narrow, it may fall entirely between electrodes and not register at all as shown at 358. Fortunately, real fingers are wide enough to allow for good interpolation with a touch pad having a feasible number of electrodes (e.g., 15 electrodes in each dimension).

To use a stylus with such a capacitive sensing touch pad, the stylus must have certain special properties. First, the stylus must be conductive so as to form the required second plate of detectable capacitance. The conductive stylus is grounded either by direct contact with the skin of the effectively grounded human, or by capacitive coupling to the human. Suitable materials for the stylus include metals, and highly conductive plastics such as nylon loaded with carbon fibers or carbon powder.

Figure 4:
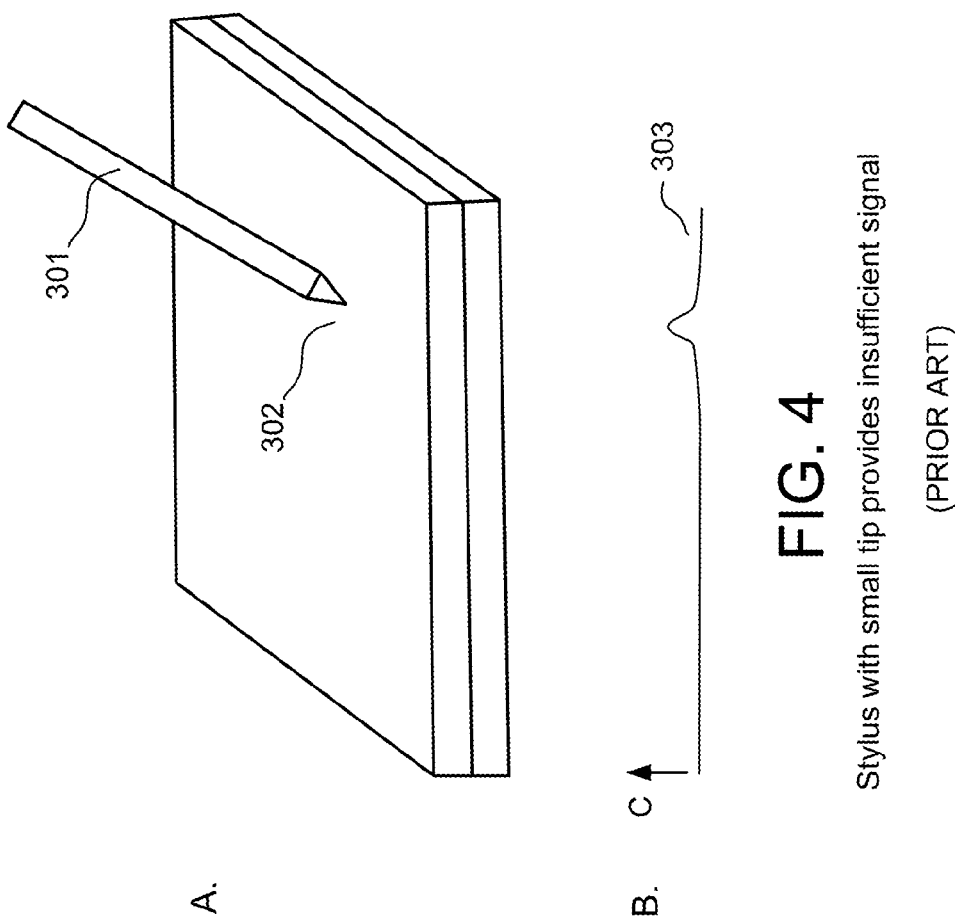
FIGS. 4A and B show, in perspective, and in graphical form, the effect of a stylus on a capacitive touch pad module and the capacitance generated as a result.

Second, the stylus must form a large enough signal on at least two adjacent traces in each dimension to allow for accurate position measurement. Traditional stylus designs feature a pointed tip which is not large enough to form a signal on more than one trace, as shown in FIG. 4. Stylus 301 has such a small contact area 302 that the resulting capacitance signal 303 is both too narrow and too low in amplitude for effective position measurement.

Figure 5:
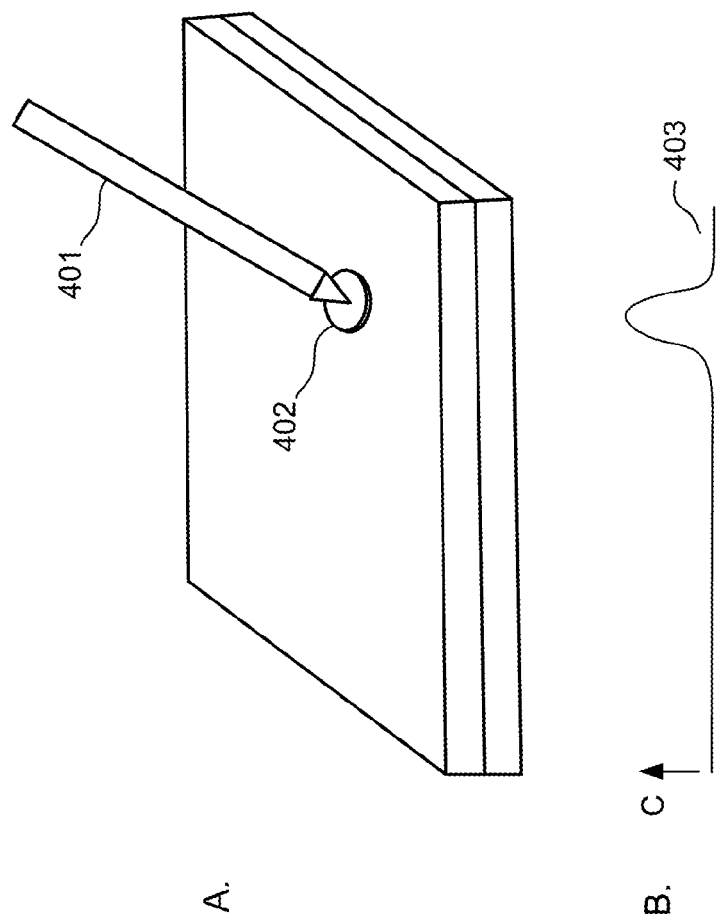
FIGS. 5A and B are similar to the depictions shown in FIGS. 4A and B with the contact area of the stylus enlarged.

Several designs for a wide stylus have been attempted. For example, a ball of conductive foam may be attached to the end of the stylus, or a small circular plate of metal can be attached by a ball joint to the tip. FIG. 5 illustrates the latter design. Stylus 401 is tipped with plate 402, whose area has been chosen to mimic the contact area of a typical finger. Hence, the capacitive signal 403 created by the plate on the electrodes is a good simulation of the signal produced by a true finger (compare curve 403 to curve 205 of FIG. 2). Stylus designs of this kind have been built and shown to work, but they are too clumsy, bulky and fragile to gain wide acceptance among users.

For these reasons, the great majority of pen-actuated touch pads currently manufactured use resistive, not capacitive, sensors. In a resistive touch pad, pressure from the finger or stylus pushes a flexible conductive membrane against another conductive surface and thereby detects a measurable electrical signal. The resistive touch pad works well with a pointed stylus, but because it requires actual pressure, the resistive pad is uncomfortable to use with a finger. Also, the large contact area of a finger reduces the accuracy of a resistive pad. Finally, because the resistive touch pad contains moving parts, it is more fragile than a capacitive touch pad. Hence, a capacitive touch pad that could work with a point-tipped stylus would be of considerable value in the marketplace.

As noted previously, the present invention involves placing a moderately conductive layer above the insulating layer, so that the grounded conductive stylus makes contact with the moderately conductive layer. The conductive layer effectively spreads out the ground image of the tip of the stylus, forming a larger second capacitor plate which can be sensed by more than one electrode on each of the horizontal and vertical axes.

Figure 6:
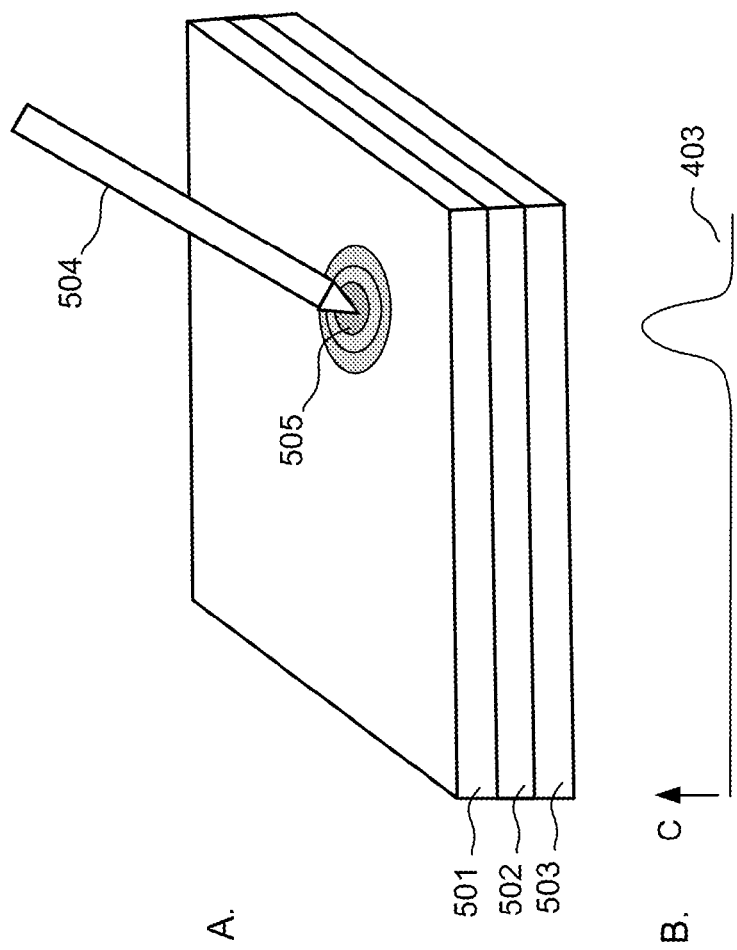
FIGS. 6A and B show, in perspective, a stylus used in conjunction with the touch pad module of the present invention and a capacitance graph generated as a result.

In FIG. 6, electrode 503 and insulating layer 502 have been covered by moderately conductive layer 501. Layer 501 is made from a conductive material durable enough to be exposed as the surface of the touch pad with no protective coating. A suitable material for this purpose is conductive carbon powder in a plastic carrier material such as epoxy. A conductive stylus 504 is then touched to the surface. Because stylus 504 is held by the human, the stylus is effectively grounded as previously disclosed. The tip of stylus 504 makes electrical contact with conductive layer 501, causing a grounded region 505 to form on the conductive layer. Because layer 501 is only moderately conductive, the grounding effect dissipates with distance from the point of contact with the stylus. A sensing circuit which measures capacitance to ground will measure a strong signal in region 505, but little or no signal far away from region 505 and the stylus tip.

By controlling the conductivity of layer 501, the perceived image size of the tip of the stylus can be adjusted to provide sufficient signal on an appropriate number of electrodes. This permits the stylus 504 to be formed in any convenient size and shape, such as that of a familiar fine-tipped pen.

Figure 7:
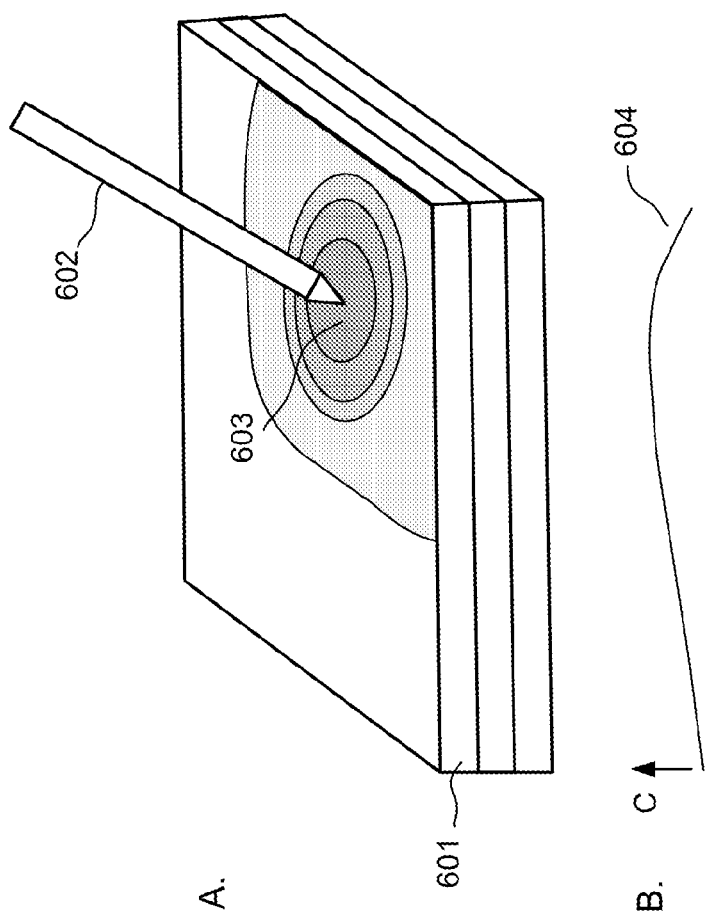
FIGS. 7A and B illustrate in perspective, and in graphical form, the results of the application of a stylus to a touch pad wherein the conductance of its top surface is too high.

If the conductive layer is too conductive, then the image will be very large, possibly even covering the entire surface of the touch pad. In this case it may not be possible to determine the location of the stylus by measuring the capacitance on each electrode. In FIG. 7, layer 601 has such high conductance (i.e., such low resistance) that stylus 602 creates a grounded region 603 that covers a large fraction of the surface. Hence, the capacitance graph 604 is so wide that it is hard to measure the peak of the curve accurately. In the extreme case of a highly conductive layer 601, contact with a stylus anywhere on the surface would produce a uniform grounding effect over the entire surface and no position information could be gained.

Figure 8:
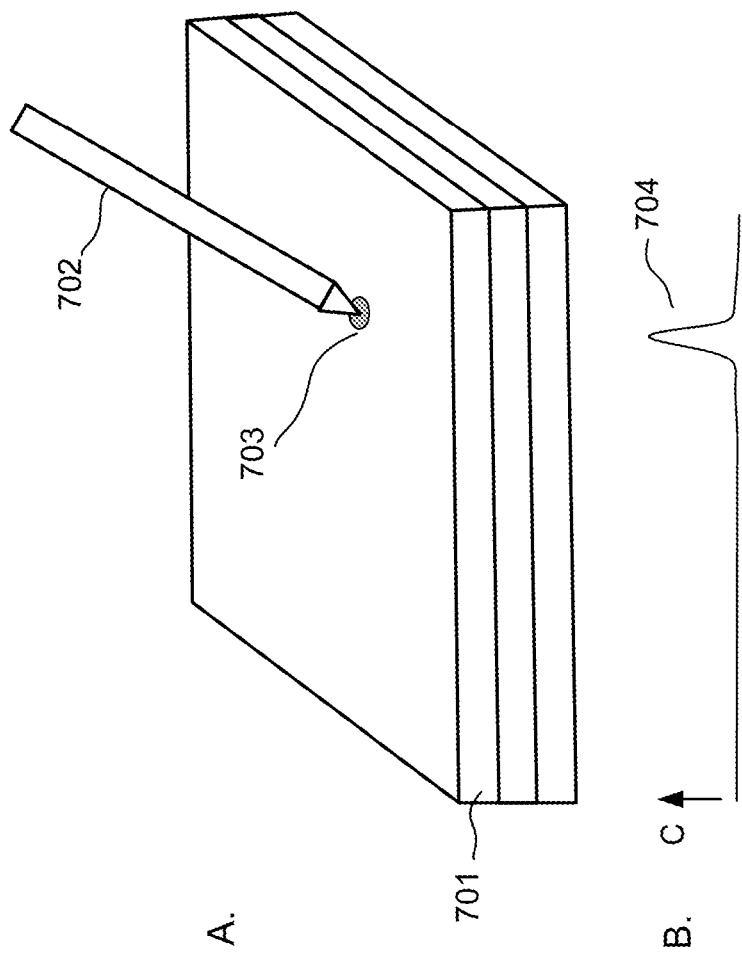
FIGS. 8A and B illustrate in perspective, and in graphical form, the results of the application of a stylus to a touch pad wherein the conductance of its top surface is too low.

If the conductive layer is not conductive enough, then the image will not be much larger than the tip of the stylus, and it may not be possible to determine the location of the stylus to a resolution any higher than the electrode pitch. In FIG. 8, layer 701 has such low conductance (i.e., such high resistance) that grounded region 703 is very small, producing a graph 704 which is not much better than graph 303 with no conductive layer at all.

For best operation, the conductivity of the surface layer should be chosen such that the image of the stylus is about the same size as the image generated by a finger on a normal capacitive sensor (note the similarity of capacitance graphs 205 of FIG. 2 and 506 of FIG. 6).

A key benefit of the present invention is that the touch pad can still be used effectively with a finger, as well as with a stylus as previously disclosed.

Figure 9:
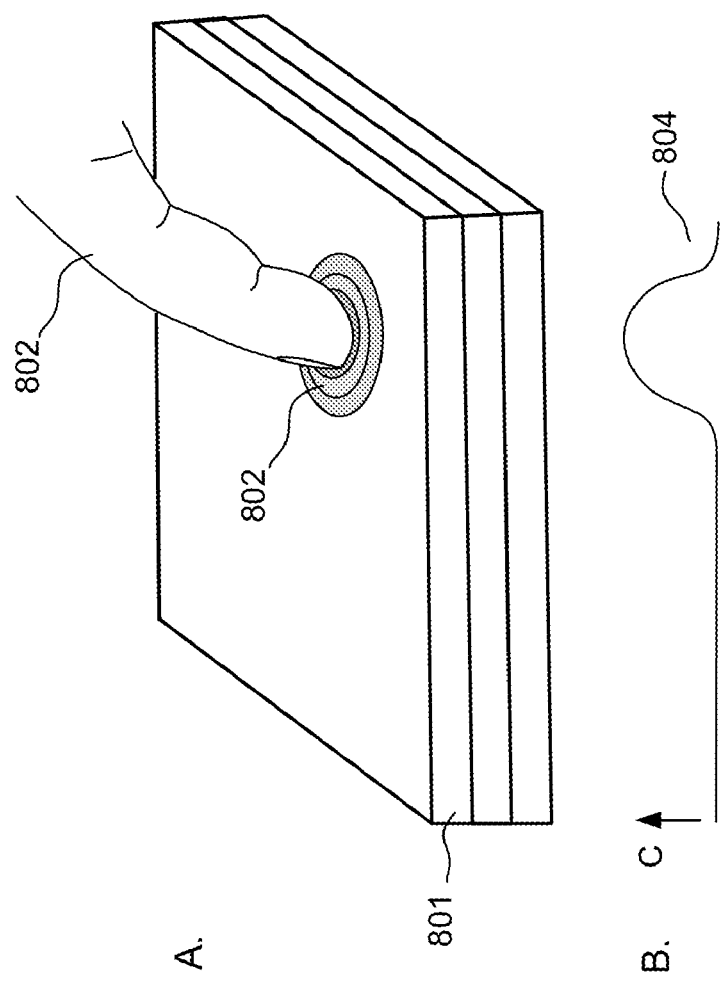
FIGS. 9A and B are similar to FIGS. 8A and B with a finger employed in place of the conductive stylus.

The fundamental mechanism of the capacitive touch pad as described above continues to detect fingers on touch pads with the additional conductive layer. In FIG. 9, finger 802 touches the surface and produces a grounded region 803 which is larger than the image of a finger on a normal touch pad, but not so large as to render the resulting capacitance graph 804 unusable for calculating the finger position.

Thus, the addition of a conductive layer 801 allows the touch pad to work well with either a stylus or a finger.

Figure 10:
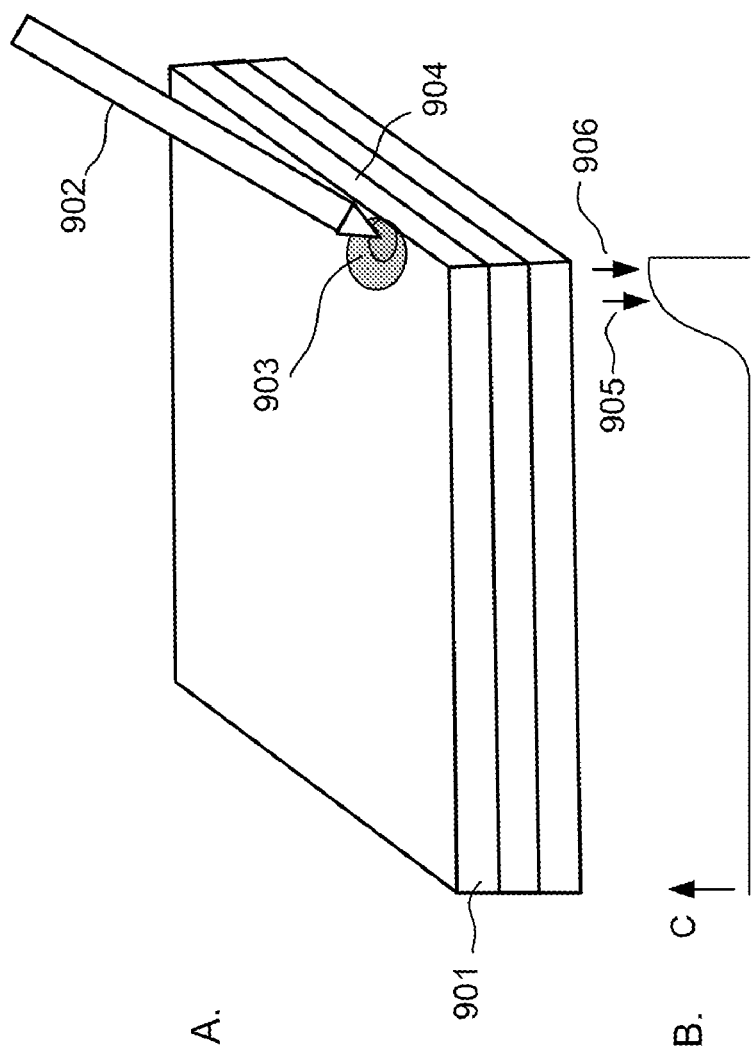
FIGS. 10A and B are again similar to FIGS. 8A and B showing the boundary effects of the conductive stylus contacting the touch pad module of the present invention near its periphery.

It was determined that when the stylus or finger nears the edge of the sensor, the present invention can cause a noticeable distortion in the measured position. Referring to FIG. 10, stylus 902 being close to edge 904 of the sensor, causes grounded region 903 to be truncated into a semicircular shape. The resulting capacitance graph shows a truncated and lop-sided curve as seen in FIG. 10B. The true peak of the curve, and thus the true stylus position, is shown by arrow 906. The centroid method, if employed, will calculate a different position 905 because the curve is truncated on one side. The simplest solution to the boundary distortion effect is to make the touch pad somewhat larger than needed, then to cover the sensor with a bezel with a smaller opening that prevents the finger or stylus from nearing the true edge of the sensor.

Another solution is to compensate for the distortion in later processing on the computed position data. This is possible because the effect of the distortion is predictable and repeatable, especially if the conductance of layer 901 is a well-controlled manufacturing variable. To compensate for the distortion, a stylus is placed at various positions across the sensor, and the corresponding measured positions tabulated. The resulting table describes a mathematical function. It is easy to see that the effect shown in FIG. 10 produces a monotonic distortion in the measured position, which means the tabulated function has an inverse which can be computed by means well known in the art. The distortion is compensated by applying this inverse function to each measured position during operation of the touch pad.

Figure 11:
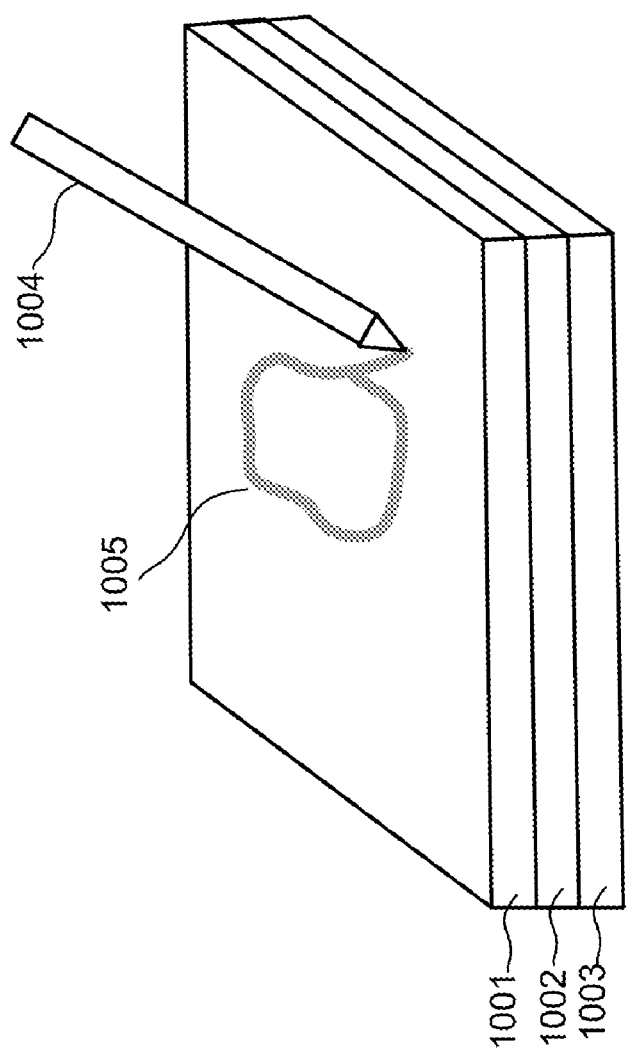
FIG. 11 is the touch pad module of the present invention in perspective showing the embodiment of providing the user with visual feedback created by the application of suitable stylus.

By choosing appropriate materials for the stylus tip and touch pad surface, the stylus can be made to leave a mark on the surface of the touch pad, giving a visual feedback to the user. In FIG. 11, the touch pad is made of the same electrode layer 1003, insulating layer 1002, and conductive layer 1001, but conductive layer 1001 is made of a material whose properties cause stylus 1004 to leave a visible trail 1005 on the surface. The material may be pliant so that the stylus leaves a groove, or have other mechanical or chemical properties that cause the stylus to leave a mark. Or, the stylus can be made of a sacrificial material such as pencil graphite which leaves a trail when moved across the surface. With an appropriate surface material, the markings can be easily wiped off so that subsequent marks are more easily visible.

It is possible to make materials which are both conductive and transparent to visible light. In this case, layer 1001 may be made transparent and layer 1002 may be made of a material which changes color or reflectivity when mechanically disturbed. In yet another approach, all three layers 1001, 1002, and 1003 may be made transparent, and the whole assembly placed over a display screen such as a liquid crystal display (LCD) which can provide visual feedback under software control.

In some applications it may be useful to be able to distinguish between stylus contact and finger contact on the touch pad. Although there is no guaranteed way to make this distinction given only the capacitance graph, it is possible to make a fairly reliable heuristic guess by noting the differences between stylus input graph 506 and finger input graph 804.

The conductive layer on the touch pad surface will expand any grounded contact by a roughly constant distance which in the preferred embodiment is comparable to the width of a finger. A stylus tip, which is essentially a point of negligible size, is expanded to be finger-sized by the conductive layer. A finger has a finger-sized contact area, which is expanded to a much larger size by the conductive layer. Thus, a finger can be expected to produce a grounded region of approximately twice the width or diameter as that of a stylus. With the diameter increased by a factor of two, the total area of grounded contact is increased by a factor of four. Hence, the system can measure either the total number of electrodes reporting increased capacitance (the diameter of the grounded region) or the total summed capacitance among all the electrodes (the area of the grounded region) to guess whether the contact is a stylus or a finger.

Another useful factor is that a capacitance signal produced by a finger will tend to fluctuate as the angle of contact of the finger on the surface changes, but a stylus signal will remain very constant. The stylus signal is independent of the angle at which the stylus is held because the contact area of the stylus tip itself is negligible. Yet another factor is that the stylus will produce no signal until contact is made with the surface, whereupon the signal will jump immediately to full strength, whereas a finger will begin producing a small signal as it approaches the surface since a finger-sized conductor creates some capacitance merely by proximity to a capacitance sensor.

FIG. 12 illustrates a graph of total summed capacitance "Z" versus time. First, a stylus contact is made which is characterized by a small, steady, sharp Z signal 1201. Then, a finger contact occurs with a larger, more varying signal 1202 with a smoother rise and fall.

In summary, the present invention recognizes, for the first time, that the application of a conductive layer above the insulating layer of a capacitive touch pad provides such an input device which works well with both a finger and a conductive stylus. In addition, it is noted that the size of the stylus tip can be made as small as desired without impacting the ability of the touch pad to accurately determine its location.

We claim:

1. A capacitive touch pad system comprising:
a sensor layer;
an insulative layer disposed over said sensor layer; and
a conductive touch layer disposed over said insulative layer, wherein said sensor layer, said insulative layer and said conductive touch layer are configured to form a capacitor with a conductive object when said conductive object contacts said conductive touch layer, said formed capacitor having a capacitance determined in part by the conductive touch layer and the conductive object, and wherein the conductive touch layer has a conductivity configured to create an image of said conductive object that is larger than an area of contact of said conductive object to thereby increase the capacitance of the formed capacitor when contacting the conductive touch layer and facilitate sensing of the capacitance to determine a position of the conductive object.

2. The touch pad system of claim 1, wherein said image of said conductive object is about the size of a finger when said area of contact is defined by a conductive stylus tip.

3. The touch pad system of claim 1, wherein said conductive touch layer comprises a conductive material disposed in a plastic carrier.

4. The touch pad system of claim 3, wherein said conductive material comprises carbon powder.

5. The touch pad system of claim 1, wherein said insulative layer, said conductive touch layer and said sensor layer are transparent, and wherein a display is positioned beneath said sensor layer and images from the display are viewable through said sensor layer, said insulative layer and said conductive touch layer, said display configured to provide visual feedback to a user of the touch pad system.

6. The touch pad system of claim 1, further comprising:
a bezel disposed over said conductive touch layer and covering a perimeter of said conductive touch layer, wherein said bezel is configured to limit edge distortion effects by preventing the conductive object from contacting the conductive touch layer at the perimeter.

7. The touch pad system of claim 1, wherein the touch pad system is configured to compensate for edge distortion by use of a correction function applied to measured conductive object positions during operation of the touch pad system.

8. The touch pad system of claim 7 wherein the correction function is generated by measurement of conductive object positions at multiple locations on said conductive touch layer, tabulation of said measurements of said conductive object positions, and development of a mathematical function from said tabulation.

9. The touch pad system of claim 1, wherein the touch pad system is configured to distinguish an identity of the conductive object by determining a change in the capacitance over a selected time period when the conductive objective is positioned proximate the conductive touch layer, wherein the a variable change in capacitance over the selected time period corresponds to a finger determination and a substantially constant capacitance over the selected time period corresponds to a stylus determination.

10. The touch pad system of claim 1 wherein the conductive touch layer is configured to produce a visual mark of the conductive object contacting said conductive touch surface.

11. The touch pad system of claim 1 wherein the conductive touch layer has the conductivity selected such that the image has an area at least four times larger than the area of contact of said conductive object.

12. The touch pad system of claim 1, wherein the touch pad system further comprises a means of distinguishing an identity of the conductive object.

13. The touch pad system of claim 12 wherein said means for distinguishing said identity of said conductive object comprises a means using a size of said image.

14. The touch pad system of claim 12 wherein said means for distinguishing said identity of said conductive object determines a change in the capacitance over a selected time period when the conductive objective is positioned proximate the conductive touch layer, wherein the a variable change in capacitance over the selected time period corresponds to a finger determination and a substantially constant capacitance over the selected time period corresponds to a stylus determination.

15. The touch pad system of claim 12 wherein said means for distinguishing said identity of said conductive object comprises a means based on a rate of change of a detected change in capacitance, wherein a stylus produces an immediate full strength detected change in capacitance upon contact with said conductive touch layer and a finger produces a gradually increasing detected change in capacitance as said finger approaches contacting said conductive touch layer.

16. A capacitive touch pad system comprising:
a sensor layer;
an insulative layer disposed over said sensor layer; and
a conductive touch layer disposed over said insulative layer, wherein said sensor layer, said insulative layer and said conductive touch layer are configured to create a detectable capacitance change when a conductive object contacts said conductive touch layer, said detectable capacitance change determined in part by said conductive touch layer and the conductive object, and wherein the conductive touch layer has a conductivity configured to create an image of said conductive object that is larger than an area of contact of said conductive object with said conductive touch layer to thereby increase said detectable capacitance change when said conductive object is contacting said conductive touch layer.

17. The capacitive touch pad system of claim 16 wherein said image of said conductive object forms a larger effective capacitive plate for coupling to said sensor layer.

18. The capacitive touch pad system of claim 16, wherein said image of said conductive object is about a size of a finger contact area when said area of contact with said conductive touch layer is defined by a tip on a conductive fine-tipped stylus.

19. The capacitive touch pad system of claim 16, wherein the conductivity of said conductive touch layer is configured to limit a size of said image to approximately four times the area of contact of said conductive object.

20. The capacitive touch pad system of claim 16, wherein said conductive touch layer is formed with a conductive material disposed in a plastic carrier.

21. The capacitive touch pad system of claim 20, wherein said conductive material comprises carbon powder.

22. The capacitive touch pad system of claim 16, wherein said insulative layer, said touch layer and said sensor layer are at least partially transparent.

23. The capacitive touch pad system of claim 22, further comprising:
a display in operative communication below said sensor layer, said display configured to be viewable through said sensor layer, said insulative layer, and said conductive touch layer.

24. The capacitive touch pad system of claim 23, wherein said display is configured to provide visual feedback to said user of said capacitive touch pad system.

25. The capacitive touch pad system of claim 16, wherein said conductive object comprises a conductive stylus holdable by said user such that said user is in electrical communication with said stylus.

26. The capacitive touch pad system of claim 16, wherein said conductive object comprises one of a metal and a conductive plastic.

27. The capacitive touch pad system of claim 16, wherein said conductive object includes a conductive tip, said conductive tip selected from the group consisting of a wide stylus, a ball of conductive foam, and a circular metal plate with a ball joint.

28. The capacitive touch pad system of claim 16, wherein said conductive object comprises a fine tipped conductive pen.

29. The capacitive touch pad system of claim 16, further comprising:
a bezel disposed over said conductive touch layer and covering a perimeter of said conductive touch layer, wherein said bezel is configured to limit edge distortion effects by preventing said conductive object from contacting said conductive touch layer at said perimeter.

30. The capacitive touch pad system of claim 16, wherein said capacitive touch pad system is configured to compensate for edge distortion by use of a correction function applied to measured conductive object positions during operation of said capacitive touch pad system.

31. The capacitive touch pad system of claim 16, wherein said calibration means comprises:
a correction function configured to compensate for edge distortion, wherein said correction function can be applied to measured conductive object positions during operation of the capacitive touch pad system.

32. The capacitive touch pad system of claim 16, wherein said capacitive touch pad system further comprises a means for distinguishing an identity of said object.

33. The capacitive touch pad system of claim 32, wherein said means for distinguishing an identity of said object comprises a means using a size of said image.

34. The capacitive touch pad system of claim 32 wherein said means for distinguishing said identity of said conductive object is configured to distinguish said identity of said conductive object by determining a change in said capacitance over a selected time period when said conductive objective is positioned proximate the conductive touch layer, wherein the a variable change in capacitance over the selected time period corresponds to a finger determination and a substantially constant capacitance over the selected time period corresponds to a stylus determination.

35. The capacitive touch pad system of claim 32 wherein said means for distinguishing said identity of said conductive object comprises a means based on a rate of change of a detected change in capacitance, wherein a stylus produces an immediate full strength detected change in capacitance upon contact with said conductive touch layer and a finger produces a gradually increasing detected change in capacitance as said finger approaches contacting said conductive touch layer.

36. A capacitive touch pad system comprising:
a sensor layer;
an insulative layer disposed over said sensor layer; and
a conductive touch layer disposed over said insulative layer, wherein said sensor layer, said insulative layer and said conductive touch layer are configured to create a detectable capacitance change when a conductive object contacts said conductive touch layer, said detectable capacitance change determined in part by said conductive touch layer and said conductive object, and wherein said conductive touch layer has a conductivity configured to create an image of said conductive object that is larger than an area of contact of said conductive object to thereby increase said detectable capacitance change when said conductive object is contacting said conductive touch layer and facilitate sensing of said detectable capacitance change to determine a position of said conductive object, and wherein said conductive touch layer is configured to produce a visual mark representative of said area of contact for providing visual feedback to the user.

37. The capacitive touch pad system of claim 36 wherein said visual mark is produced by a mechanical contact of said conductive object with said conductive touch layer.

38. The capacitive touch pad system of claim 36 wherein said visual mark is produced by a chemical property of said conductive object.

39. The capacitive touch pad system of claim 37 wherein said visual mark is an alteration in at least one of a color and a reflectivity produced by said mechanical contact of said conductive object with said conductive touch layer.

40. The capacitive touch pad system of claim 37 wherein said visual mark is produced by a sacrificial material on a tip of said conductive object.

41. The capacitive touch pad system of claim 40 wherein said sacrificial material comprises graphite.

42. The capacitive touch pad system of claim 37 wherein said conductive touch layer comprises a pliant material, and wherein visual mark is produced by a groove in said conductive touch layer in response to mechanical contact of said conductive object with said conductive touch layer.

43. The capacitive touch pad system of claim 37 wherein said visual mark produced by said mechanical contact of said conductive object with said conductive touch layer is removable.

44. The capacitive touch pad system of claim 36 wherein said visual mark is produced by a layer of liquid crystal material coupled to said conductive touch layer in response to mechanical contact of said conductive object with said conductive touch layer.

45. A touch pad system comprising:
a sensor layer;
an insulative layer disposed over said sensor layer; and
a touch layer disposed over said insulative layer, said touch layer having a conductivity selected to create an image of a conductive object that is larger than an area of contact of said conductive object, and wherein said sensor layer capacitively detects the image of said conductive object when said conductive object is placed proximate to said touch layer, wherein the conductivity of said touch layer is configured to limit the size of said image to approximately four times the area of contact of said conductive object.

46. A capacitive touch pad system comprising:
a sensor layer;
an insulative layer disposed over said sensor layer; and
a conductive touch layer disposed over said insulative layer, wherein said sensor layer, said insulative layer and said conductive touch layer are configured to form a capacitor with a conductive object when said conductive object is placed proximate to said sensor layer, said formed capacitor having a capacitance determined in part by the conductive touch layer and the conductive object, and wherein the conductive touch layer comprises conductive carbon disposed in epoxy and has a conductivity selected to create an image of said conductive object that is at least four times larger than an area of contact of said conductive object to thereby increase the capacitance of the formed capacitor when contacting said conductive touch layer and facilitate sensing of the capacitance to determine a position of the conductive object.

* * * * *